May 3, 1932. E. T. PARSONS 1,856,585
FLOUR DUSTER
Filed Nov. 21, 1931 2 Sheets-Sheet 1
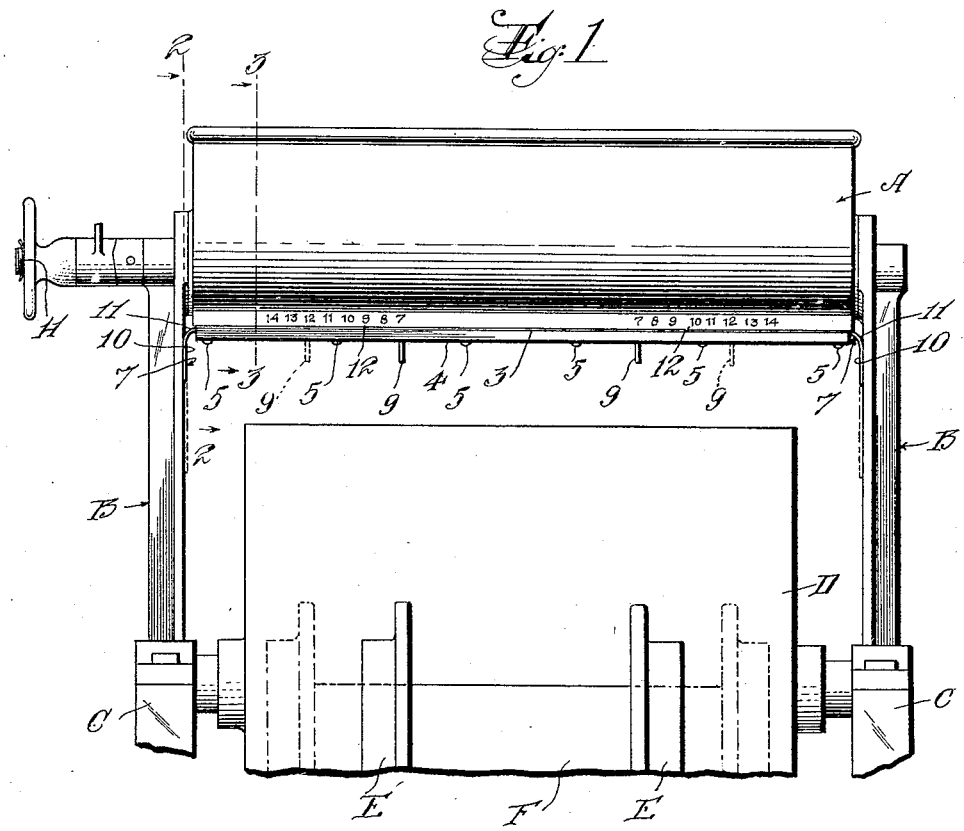
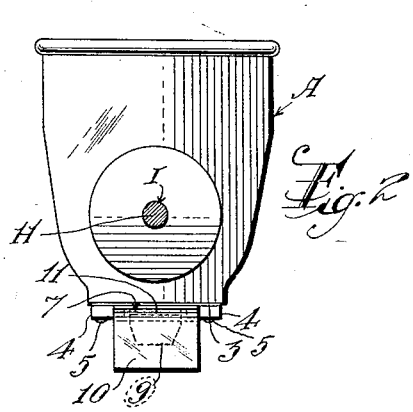
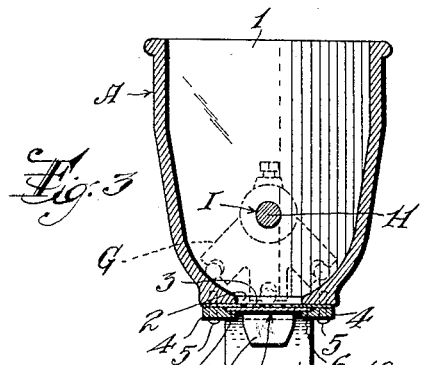
INVENTOR.
Edward T. Parsons,
BY
ATTORNEYS.

May 3, 1932.  E. T. PARSONS  1,856,585
FLOUR DUSTER
Filed Nov. 21, 1931   2 Sheets-Sheet 2
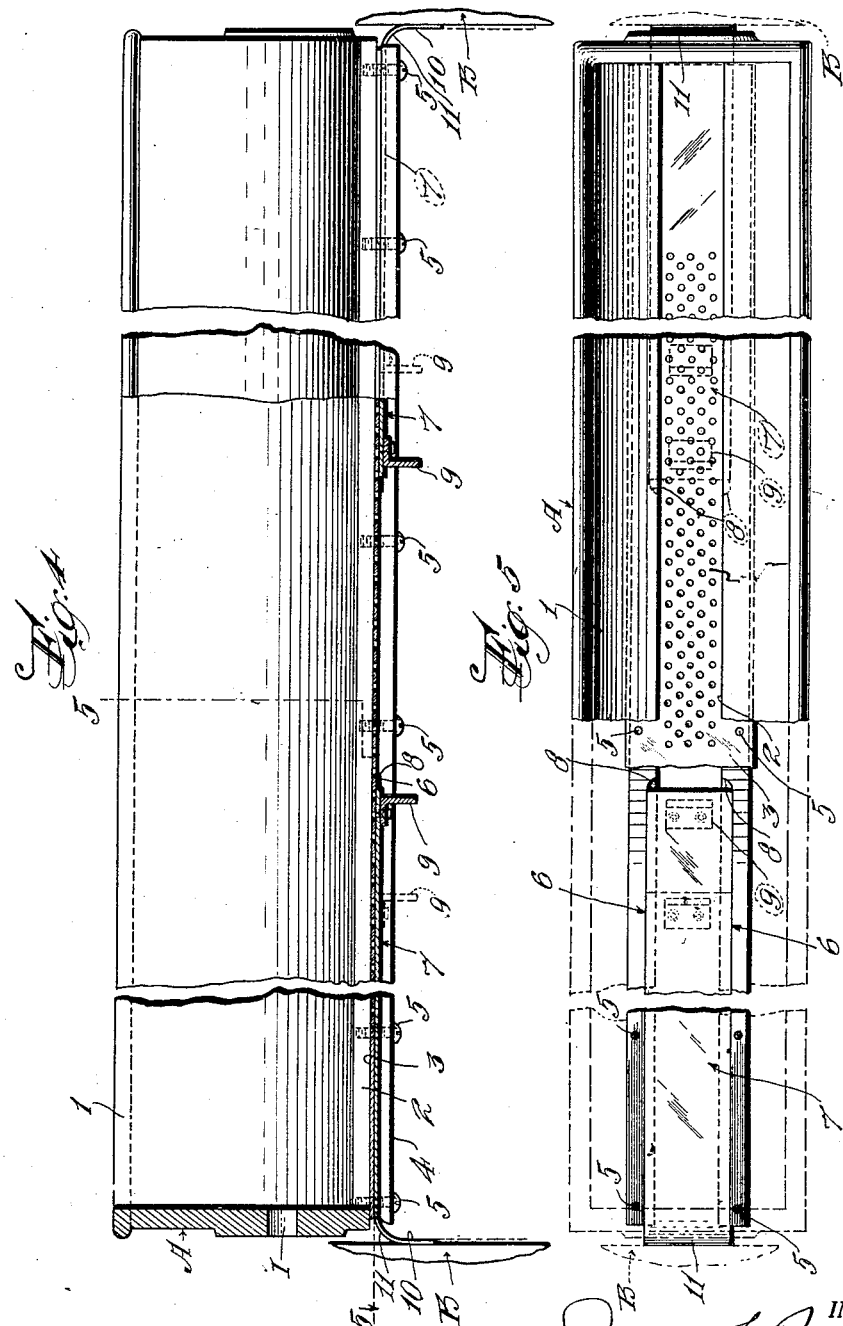
INVENTOR.
Edward T. Parsons,
BY
Everett & Rook,
ATTORNEYS.

Patented May 3, 1932

1,856,585

UNITED STATES PATENT OFFICE

EDWARD T. PARSONS, OF UPPER MONTCLAIR, NEW JERSEY, ASSIGNOR TO THOMSON MACHINE COMPANY, OF BELLEVILLE, NEW JERSEY, A CORPORATION OF NEW JERSEY

FLOUR DUSTER

Application filed November 21, 1931. Serial No. 576,471.

This invention relates to a flour duster or sifter particularly for use on loaf molding machines for bakeries, although the invention is susceptible of use for other purposes.

More especially the invention is directed to a flour duster having a regulating device or outlet valve for varying or regulating the area of the discharge or outlet opening to adapt the same for use in distributing flour over kneading or molding surfaces of different areas to ensure adequately supply of flour at all times and prevent waste thereof on portions of the molding surfaces not actually used at a given time for molding.

Many dough molding machines include a rotating drum having flanges adjustable longitudinally thereof and a set of arcuate compression plates of different widths to be interchangeably arranged between said flanges in spaced relation to the periphery of said drum to provide molding or kneading chambers of different lengths to form loaves of different lengths, for example as shown in Patents No. 629,983, No. 1,542,833 and No. 1,620,559; and another object of my invention is to provide a novel and improved flour duster for distributing floor upon the periphery of such a drum between said flanges, and having means for regulating the length of the outlet or discharge opening of the duster to correspond to the distance between the flanges, so that a sufficient quantity of flour shall always be supplied between the flanges, and waste of flour, as by distributing it upon the drum outside said flanges, shall be obviated.

A further object is to provide a flour duster of this character including a hopper having a perforate bottom wall, and a pair of regulating shutters or slides each comprising flexible material, and novel means for mounting said slides for movement longitudinally of said bottom toward and from each other and a point intermediate the ends of said bottom to uncover more or less of the bottom between said shutters to permit egress of flour and cover the other portions of said bottom to prevent flour from being ejected therethrough.

Other objects are to provide such a flour duster wherein each of said shutters comprises a strip of resilient imperforate material slidably mounted on the bottom of said hopper, and said hopper has adjacent its ends surfaces at right angles to the plane of said bottom so that the end portions of said shutters projecting beyond the ends of said bottom are flexed or bent and frictionally slide over said surfaces, whereby a compact construction is provided and said shutters are frictionally held in adjusted positions; to provide a flour duster of the character described wherein the hopper is mounted on standards at its ends in spaced relation to the ends of said bottom, and said shutters are slidable in guide grooves with their outer end portions projecting from the grooves beyond the end of said bottom and flexed into contact with the adjacent surfaces of said standards so as to frictionally engage said surfaces; and to obtain other advantages and results as will be brought out by the following description.

For the purpose of illustrating the principles of the invention, I have shown it in the accompanying drawings in connection with a known drum type of dough molding machine, but it should be understood that this is primarily for the purpose of illustrating the principles of the invention, and that the invention may be used for other purposes without departing from the spirit or scope of the invention.

Referring to said drawings, in which corresponding and like parts are designated throughout the several views by the same reference characters, Figure 1 is a front elevation of a flour duster embodying my invention, showing the same mounted on a drum type dough molding machine which is fragmentarily illustrated;

Figure 2 is a sectional view, on the line 2—2 of Figure 1;

Figure 3 is a similar view, on the line 3—3 of Figure 1;

Figure 4 is an enlarged view of the flour duster partially in side elevation and partially in longitudinal section, and Figure 5 is a top plan view of the flour duster, with portions broken away on the line 5—5 of Figure 4.

Specifically describing the illustrated embodiment of the invention, the flour duster includes a hopper A which may be formed of any suitable material, such as cast iron, and is provided with an open top 1 for charging the hopper, and an opening 2 in the bottom which is closed by a thin sheet of perforate metal 3. This plate is shown as secured to the hopper between the edges of the bottom of the hopper and bars 4, one at each of the longitudinal sides of the bottom. Suitable fastening members, such as screws 5, pass through the bars 4 and the plate 3 into the hopper.

The bars 4 have rabbets 6 which face each other and the outside of the plate 3 so as to form guideways for shutters 7.

As shown on the drawings, there are two of these shutters 7, and each thereof comprises a strip of thin highly resilient sheet metal. One of the shutters is slidably mounted in the guideways at each end of the hopper, and the shutters are movable longitudinally of the bottom of the hopper toward and from each other to cover and uncover the perforations in the plate 3. The shutters may be arranged to move toward and into contact with each other at substantially the center of the length of the hopper so as to entirely close all of the perforations in the plate 3, but preferably the movement of the shutters toward each other is limited by shoulders 8 at the inner ends of the rabbets 6 so that a predetermined area of the perforated plate at an intermediate portion in its length is always uncovered, as clearly shown in Figures 4 and 5. Each shutter has on its outer side adjacent its inner end, a handle 9 of suitable construction whereby the shutter may be slid in the guideways, and the outer ends of the shutters project from the guideways beyond the ends of the bottom of the hopper, as shown in Figures 1, 4 and 5. With this construction, it will be observed that by sliding the shutters over the perforated bottom of the hopper, the area of the outlet or discharge portion of the plate 3 may be varied as the result of covering or uncovering of the perforations in the plate.

In the preferred use of the invention, the hopper 1 is mounted at its ends by standards B upon the frame C of a dough molding machine which includes a rotating drum D and flanges E which are adjustable longitudinally of the drum, as indicated by solid and dot and dash lines in Figure 1 of the drawings, and between which may be arranged arcuate compression plates F of different widths corresponding to the distances between the flanges so as to form a kneading or molding chamber between the compression plates and the periphery of the drum. The shoulders 8 at the inner ends of the rabbets 6 are located to limit movement of the shutters toward the center of the hopper so that the distance between the inner ends of the shutters is substantially equal to the minimum distance between the flanges E. This ensures an adequate supply of flour being deposited through the plate 3 upon the drum D between the flanges E, and prevents discharge of flour from the hopper upon the drum outside the flanges E. When the flanges are moved apart to provide a wider molding chamber, the shutters 7 may be similarly moved apart as indicated by dot and dash lines in Figure 1, so that an adequate supply of flour upon the portion of the drum which is being used for molding operations at any given time is ensured, and waste of flour upon inactive portions of the drum is prevented.

Another feature of the invention is the provision of means to engage the end portions 10 of the shutters which project from the outer ends of the guideways so as to flex said end portions into planes at substantially right angles to the bottom of the hopper and frictionally engage said end portions to resist sliding movement of the shutters and thereby hold them in their adjusted positions. As shown on the drawings, this means includes the standards B which are arranged in close proximity to the ends of the hopper so that the end portions of the shutters frictionally contact with and slide over the adjacent surfaces of the standards, as clearly shown by dot and dash lines in Figures 1 and 4. The flexibility or resiliency of the material of which the shutters is formed permits this flexing or bending of the shutters and also holds the projecting end portions thereof in contact with the standards. Accordingly, when either of the shutters has been moved to a desired position, it is there frictionally held. The friction is further increased by the bend in the shutters where they leave the guideways, as indicated at 11, which causes the shutters to frictionally slide over the ends of the guideway. The projecting end portions of the shutters are located in out-of-the-way positions so as to provide a compact arrangement of the parts and eliminate projections or obstructions; and the shutters can be easily and quickly operated by simple pulling or pushing upon the handles 9.

If desired, agitating mechanism for the flour within the hopper may be utilized, for example, such as shown in Patent No. 1,548,379, dated August 4, 1925. This agitator mechanism is indicated by dot and dash lines G in Figure 3 of the drawings, and is operated by a shaft H that extends longitudinally of the hopper and passes through openings I in the ends thereof for connection to any suitable source of power.

To facilitate setting of the shutters, one or both sides of the hopper may be provided with inscriptions or indicia 12. As shown, this indicia comprises figures which indicate the distance in inches between the inner ends of the shutters when the handles 9 are arranged in alinement with the respective figures. For example, as shown by solid lines in Figure 1, the shutters are set for a distance of seven inches between the flanges E.

While I have shown and described the invention as embodied in certain details of construction, it should be understood that this is primarily for the purpose of illustrating the principles of the invention, and that many modifications and changes may be made in the details of construction without departing from the spirit or scope of the invention.

Having thus described the invention, what I claim is:

1. The combination with a dough molding machine having a molding surface to be dusted with flour, of a flour duster comprising a hopper having an opening at its bottom, a perforate plate on the exterior of said bottom to cover said opening, vertical standards at opposite ends of said hopper for supporting said hopper on said machine with said bottom horizontally disposed, bars one at each of opposite sides of the exterior of said plate having rabbets facing each other and said perforate plate, fastening members passing through said bars and said plate into said hopper for securing both the plate and said bars to the hopper, and a pair of shutters formed of strips of resilient sheet metal mounted in said rabbets one at each end of said bottom to slide over said perforate plate toward and from each other to cover and uncover the perforations in said plate, said shutters having their outer ends flexed and frictionally contacting with the respective standards.

2. The combination with a dough molding machine having a molding surface to be dusted with flour, of a flour duster comprising a hopper having a perforate bottom, vertical standards at opposite ends of said hopper for supporting it on said machine with said bottom horizontally disposed, a pair of shutters each comprising a strip of resilient sheet metal, and guide means on said hopper mounting said shutters one at each end of said bottom for sliding movement toward and from each other over said bottom to cover and uncover the perforations therein, the outer ends of said shutters projecting from said guide means and being flexed into frictional contact with the respective standards.

3. A device of the character described, comprising a hopper having a perforate bottom and surfaces at opposite ends thereof at angles to the plane of said bottom, a pair of shutters each comprising a strip of resilient sheet metal, and guide means on said hopper mounting said shutters one at each end of said bottom for sliding movement toward and from each other over said bottom to cover and uncover the perforations therein, the outer ends of said shutters projecting from said guide means and being flexed into frictional contact with the respective said surfaces at the ends of said bottom.

4. A device of the character described, comprising a hopper having an opening at its bottom, a perforate plate on the exterior of said bottom to cover said opening, bars one at each of opposite sides of the exterior of said bottom having rabbets facing each other and said bottom, fastening members passing through said bars and said plate into said hopper to secure the plate and the bars to the hopper, and a pair of shutters each comprising flexible material mounted in said rabbets one at each end of said bottom to slide over said perforate plate toward and from each other to cover and uncover the perforations in said plate, the outer end portions of said shutters projecting from the ends of said rabbets and being flexed into planes at substantially right angles to said bottom.

5. A device of the character described, comprising a hopper having an opening at its bottom, a perforate plate on the exterior of said bottom to cover said opening, bars one at each of opposite sides of the exterior of said bottom having rabbets facing each other and said bottom, fastening members passing through said bars and said plate into said hopper to secure the plate and the bars to the hopper, a pair of shutters each comprising a strip of resilient sheet metal mounted in said rabbets one at each end of said bottom to slide over said perforate plate toward and from each other to cover and uncover the perforations in said plate, the outer end portions of said shutters projecting from the ends of said rabbets, and means for flexing and guiding said end portions in planes at substantially right angles to said bottom.

6. A device of the character described, comprising a hopper having an opening at its bottom, a perforate plate on the exterior of said bottom to cover said opening, bars one at each of opposite sides of the exterior of said bottom having rabbets facing each other and said bottom, fastening members passing through said bars and said plate into said hopper to secure the plate and the bars to the hopper, a pair of shutters each comprising flexible material mounted in said rabbets one at each end of said bottom to slide over said perforate plate toward and from each other to cover and uncover the perforations in said plate, the outer end portions of said shutters projecting from the ends of said rabbets, and means frictionally engaging said end portions.

7. A device of the character described, comprising a hopper having an opening at its bottom, a perforate plate on the exterior of said bottom to cover said opening, bars one at each of opposite sides of the exterior of said bottom having rabbets facing each other and said bottom, fastening members passing through said bars and said plate into said hopper to secure the plate and the bars to the hopper, a pair of shutters each comprising a strip of resilient sheet metal mounted in said rabbets one at each end of said bottom to slide over said perforate plate toward and from each other to cover and uncover the perforations in said plate, the outer end portions of said shutters projecting from the ends of said rabbets, and means engaging said end portions for frictionally resisting sliding of said shutters.

8. A device of the character described, comprising a hopper having a perforate bottom, a pair of shutters comprising flexible material, and guide means mounting said shutters on the exterior of said bottom for sliding movement toward and from each other over said bottom to cover and uncover the perforations in the bottom, the end portions of said shutters projecting from said guide means and being flexed into planes at substantially right angles to said bottom.

9. A device of the character described, comprising a hopper having a perforate bottom, a pair of shutters comprising flexible material, guide means mounting said shutters on the exterior of said bottom for sliding movement toward and from each other over said bottom to cover and uncover the perforations in the bottom, the end portions of said shutters projecting from said guide means, and means engaging said end portions for frictionally resisting sliding of said shutters.

10. A device of the character described, comprising a hopper having a perforate bottom, a pair of shutters comprising strips of resilient sheet metal, guide means mounting said shutters on the exterior of said bottom for sliding movement toward and from each other over said bottom to cover and uncover the perforations in the bottom, the end portions of said shutters projecting from said guide means, and means for flexing and guiding said projecting end portions into planes at substantially right angles to said bottom.

11. A device of the character described, comprising a hopper having a perforate bottom, a pair of shutters comprising strips of resilient sheet metal, guide means mounting said shutters on the exterior of said bottom for sliding movement toward and from each other over said bottom to cover and uncover the perforations in the bottom, the end portions of said shutters projecting from said guide means, and means frictionally engaging said projecting end portions to frictionally resist sliding of said shutters.

12. A device of the character described, comprising a hopper having a perforate bottom, a flexible shutter, and guide means mounting said shutter for sliding movement upon said bottom to cover and uncover the perforations in said bottom, one end of said shutter projecting from said guide means and being flexed into a plane at substantially right angles to said bottom.

13. A device of the character described, comprising a hopper having a perforate bottom, a flexible shutter, guide means mounting said shutter for sliding movement upon said bottom to cover and uncover the perforations in said bottom, one end of said shutter projecting from said guide means, and means for flexing and guiding said end portion into a plane at substantially right angles to said bottom.

14. A device of the character described, comprising a hopper having a perforate bottom, a flexible shutter, guide means mounting said shutter for sliding movement upon said bottom to cover and uncover the perforations in said bottom, one end of said shutter projecting from said guide means, and means engaging said end portion to frictionally resist sliding of said shutter.

EDWARD T. PARSONS.